R. A. CARSON.
VALVE GRINDER.
APPLICATION FILED AUG. 31, 1920.

1,436,150.

Patented Nov. 21, 1922.
2 SHEETS—SHEET 1.

INVENTOR
ROBERT A. CARSON
BY
HIS ATTORNEY.

R. A. CARSON.
VALVE GRINDER.
APPLICATION FILED AUG. 31, 1920.

1,436,150.

Patented Nov. 21, 1922.
2 SHEETS—SHEET 2.

INVENTOR
ROBERT A. CARSON
BY
HIS ATTORNEY

Patented Nov. 21, 1922.

1,436,150

UNITED STATES PATENT OFFICE.

ROBERT A. CARSON, OF KANSAS CITY, MISSOURI.

VALVE GRINDER.

Application filed August 31, 1920. Serial No. 407,237.

*To all whom it may concern:*

Be it known that I, ROBERT A. CARSON, a citizen of the United States, residing at Kansas City, in the county of Jackson and State of Missouri, have invented certain new and useful Improvements in Valve Grinders; and I do hereby declare the following to be a full, clear, and exact description of the invention, such as will enable others skilled in the art to which it appertains to make and use the same.

This invention relates to valve grinders and it consists in the novel features hereinafter described and claimed.

An object of the invention is to provide a valve grinder of simple and durable structure having means for partially turning or reciprocating the valve back and forth upon its seat whereby the grinding action is effected.

A still further object of the invention is to provide means for initially imparting to the valve relatively short reciprocatory movement and these movements are gradually increased and successively until the maximum movement is accomplished when the series of movements of different relative lengths is repeated.

With the above objects in view, the valve grinder comprises a frame provided with a transversely disposed bearing. A shaft is journaled in the frame and carries at its lower end a member in the form of a tool which may be used for a number of different purposes. As for instance a spanner wrench, a screw driver, and a valve seat scraper. A beveled pinion is mounted upon the upper end of the said shaft. A shaft is journaled in the bearing and a crank handle is fixed to one end thereof. Beveled wheels are mounted upon the last mentioned shaft in the vicinity of the ends thereof and are located one at each side of the said pinion. The said beveled wheels are provided with several series of the teeth with blank spaces intervening between the sets of teeth. The teeth upon one of the beveled wheels are opposite a blank space upon the other beveled wheel and vice versa. The teeth are adapted to mesh with the teeth of the beveled pinion consequently when the second mentioned shaft is rotated, rotary movement is imparted to the first mentioned shaft alternately in opposite directions and inasmuch as the sets of teeth include different numbers of teeth, the initial or reciprocatory partial rotary movement imparted to the first mentioned shaft is comparatively short and these movements gradually increase in length and successively throughout the series of teeth. Therefore, when the spanner wrench is in engagement with a valve, the valve is turned in the valve seat and the movement imparted to the valve serves to grind the peripheral portion of the valve and the seat.

In the accompanying drawings:—

Figure 1:
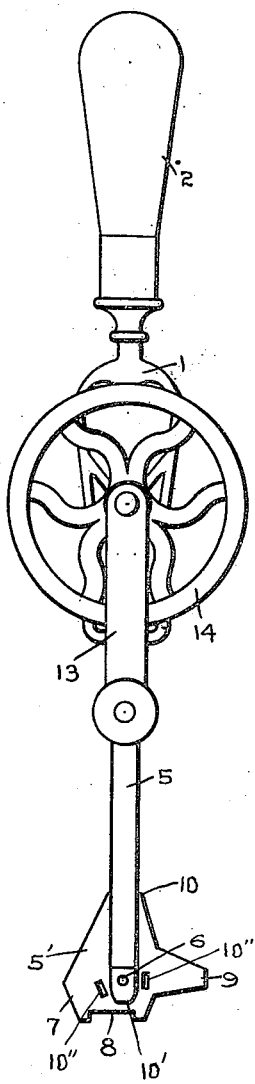
Figure 1 is a side elevation of the valve grinder.
Figure 2:
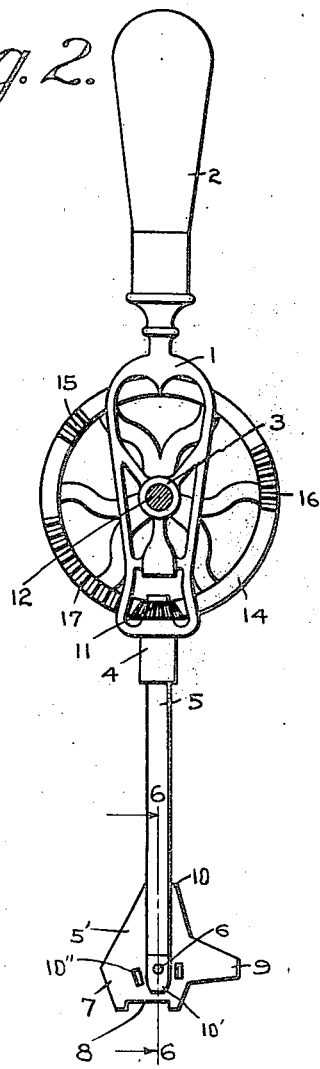
Figure 2 is a vertical sectional view of the same.
Figure 3:
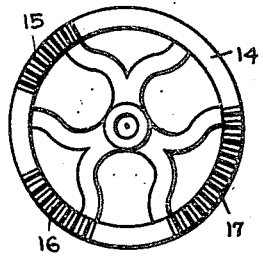
Figure 3 is a front elevation of one of the main gear wheels.
Figure 4:
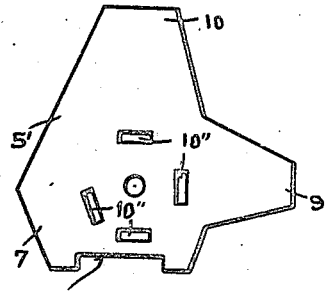
Figure 4 is a front elevation of the tool or valve engaging member.
Figure 5:
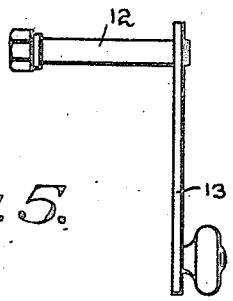
Figure 5 is a side elevation of the operating crank.
Figure 6:
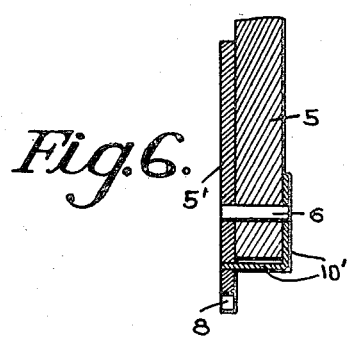
Figure 6 is a detail section on line 6—6 of Figure 2.

As illustrated in the accompanying drawings, the valve grinder comprises a frame 1 having a handle 2 attached to the upper end thereof. The frame 1 is provided at a point between its upper and lower ends with a transversely disposed bearing 3 and at its lower end the said frame is provided with a bearing 4 which is substantially in alinement with the longitudinal dimension of the handle 2. A shaft 5 is journaled for rotation in the bearing 4 and is provided at its lower portion with a pivot 6. A valve engaging member 5 is pivotally mounted upon the pivot 6 and its portion 7 is adapted to be used for scraping a valve seat. The portion 8 may be used as a spanner wrench and the portions 9 may be used as screw driver points. Inasmuch as the member 7 may rotate upon the pivot 6 any of the portions 8, 9 and 10 may be moved substantially into alinement with the shaft 5. The shaft 5 is provided with a spring catch 10' adapted to engage in vents 10'' provided upon the member 7 whereby the particular portion may be retained substantially in alinement with the shaft 5. A beveled pinion 11 is fixed to the upper end of the shaft 5 and is positioned between the ends of the frame 1. A shaft 12 is journaled for rotation in the bearing 3 and a crank handle 13 is fixed to one end portion of the shaft 12. Beveled wheels 14 are mounted upon the opposite end portions of the shaft 12 and are fixed thereto. The said wheels 14 are disposed one at each side of the beveled pinion 11. The beveled wheels 14 are provided with sets of gear teeth 15, 16, and 17 and spaces intervene between the several sets of gear teeth. The gear teeth upon one of the beveled wheels 14 are located opposite the spaces of the other beveled wheel 14 and vice versa. The sets 15 of the teeth are composed of a minimum number of teeth. The sets 16 are composed of an intermediate number of teeth and the sets 17 are composed of maximum numbers of gear teeth. All of the gear teeth of the several sets are adapted to mesh with the teeth of the pinion 11 when the wheels 14 are rotated.

Therefore, it will be seen that when the shaft 12 is rotated by using the crank handle 13, reciprocatory rotary movement is imparted by the beveled wheels 14 to the beveled pinion 11 and the shaft 5. The initial reciprocatory movement is composed of relatively short strokes. The intermediate reciprocatory movement is composed of relatively longer strokes and the final reciprocatory movement is composed of strokes of maximum length. Therefore, when the spanner portion 8 is in engagement with a valve and the valve rests upon the seat, the initial movement of the valve is relatively short during the grinding action and this will remove any grit from between the valve and the valve seat so that the long movement of the valve upon the valve seat will have a tendency to smoothly grind the surfaces of the valve and valve seat.

Having described the invention what is claimed is:

A tool of the class described having a shaft, a transverse pin extending therefrom, a tool member journaled on said pin on one side of the shaft, a leaf spring mounted by the pin on the other side of the shaft, said spring having a portion extending across the adjacent end of the shaft and relatively close thereto, to overcome its tendency to turn from the pin as a center whereby said pin may serve as its sole fastening means, and said tool member having recesses to be selectively entered by said portion.

In testimony whereof I affix my signature in presence of two witnesses.

ROBERT A. CARSON.

Witnesses:
H. H. McLucas,
C. E. Lewis.